United States Patent [19]

Kogure et al.

[11] Patent Number: 5,427,867

[45] Date of Patent: Jun. 27, 1995

[54] SUBSTRATE USED FOR MAGNETIC DISK AND MAGNETIC RECORDING MEDIUM USING THE SUBSTRATE

[75] Inventors: Toshihiro Kogure, Tsukuba; Tomoyasu Shimizu, Sapporo; Toshiyuki Sato; Shinya Katayama, both of Tsukuba, all of Japan

[73] Assignee: Nippon Sheet Glass Co., Ltd., Osaka, Japan

[21] Appl. No.: 253,573

[22] Filed: Jun. 3, 1994

Related U.S. Application Data

[63] Continuation of Ser. No. 14,199, Feb. 5, 1993, abandoned, which is a continuation of Ser. No. 527,077, May 22, 1990, abandoned.

[30] Foreign Application Priority Data

May 22, 1989 [JP] Japan .................................. 1-128339
Apr. 27, 1990 [JP] Japan .................................. 2-113744

[51] Int. Cl.⁶ .................................................. G11B 5/00
[52] U.S. Cl. ........................................ 428/611; 428/64; 428/141; 428/408; 428/433; 428/650; 428/651; 428/660; 428/694 TC; 428/694 TS; 428/694 TR; 428/694 SG; 428/900; 428/928
[58] Field of Search ................ 428/64, 611, 652, 661, 428/686, 694, 695, 433, 694 SG, 694 TS, 900, 141, 408, 650, 651, 660, 694 TC, 694 TR, 928

[56] References Cited

U.S. PATENT DOCUMENTS

| | | | |
|---|---|---|---|
| 3,150,939 | 9/1964 | Wenner | 428/694 |
| 4,074,016 | 2/1978 | Trippel | 428/626 |
| 4,539,265 | 9/1985 | Yazawa | 428/621 |
| 4,543,301 | 9/1985 | Yazawa et al. | 428/621 |
| 4,696,862 | 9/1987 | Kawana et al. | 428/336 |
| 4,745,005 | 5/1988 | Sugita et al. | 427/128 |
| 4,833,020 | 5/1989 | Shiroishi et al. | 428/336 |
| 5,047,274 | 9/1991 | Tsuya et al. | 428/64 |
| 5,134,038 | 7/1992 | Baseman et al. | 428/611 |

FOREIGN PATENT DOCUMENTS

| | | |
|---|---|---|
| 49-122707 | 11/1974 | Japan . |
| 62-103823 | 5/1987 | Japan . |
| 62-112774 | 5/1987 | Japan . |
| 62-256215 | 11/1987 | Japan . |
| 63-160010 | 7/1988 | Japan . |
| 63-160014 | 7/1988 | Japan . |

*Primary Examiner*—Stevan A. Resan
*Attorney, Agent, or Firm*—Woodcock Washburn Kurtz Mackiewicz & Norris

[57] ABSTRACT

A substrate used for magnetic disk comprising s non-magnetic support in which a material for forming pits is formed on the surface, wherein the material for forming the surface pits comprises a low melting metal and has an island structure discontinuous in the direction within the plane at the surface of the non-magnetic support, thereby enabling to produce a magnetic disk of excellent magnetic property at high productivity, as well as a magnetic recording medium using such a substrate.

1 Claim, 4 Drawing Sheets

SUBSTRATE USED FOR MAGNETIC DISK AND MAGNETIC RECORDING MEDIUM USING THE SUBSTRATE

This is a continuation of application Ser. No. 08/014,199, filed Feb. 5, 1993 now abandoned which is a continuation of application Ser. No. 527,077, filed May 22, 1990 now abandoned.

BACKGROUND OF THE INVENTION

1. Field of the Invention

The present invention concerns a substrate used for a magnetic disk by using a non-magnetic substrate such as glass, as well as a magnetic recording medium using such a substrate. More in particular, it relates to a substrate used for a magnetic disk capable of manufacturing a magnetic disk of excellent magnetic property and with high productivity, as well as a magnetic recording medium using such a substrate.

1. Description of the Prior Art

Generally, a glass substrate has been noted as a substrate used for a high density magnetic disk since the substrate has excellent surface smoothness, high hardness, and great deformation resistance, less surface defects, etc. (refer, for example, to Japanese Patent Laid Open Sho 49-122707 and Sho 52-18002).

A method of physically and/or chemically etching the surface of a glass substrate to form unevenness (or pits), thereby improving a contact characteristics (such as CSS property and, head static property) between a magnetic disk and a magnetic head has been known (for example, Japanese Patent Laid Open Sho 63-160010).

A method has also been known for forming pits on the surface of a glass substrate by means of spraying minute droplets of a solution of an organic metal compound thereby improving the contact characteristics (for example, in Japanese Patent Laid Open Sho 63-160014).

Further, a method has also been known for forming a pit forming layer made of Al on a glass substrate thereby improving the contact characteristics (Japanese Patent Laid Open Sho 62-256215).

When a magnetic disk is prepared by using a glass substrate formed with surface pits as described above, there has been problem that magnetic characteristics can not be attained as expected, although the contact characteristic can be improved.

In addition, there has been a problem that the method of forming the pits on the surface is complicated, or the method of etching the surface reduces the strength of the glass substrate or worsens the smoothness.

The method of using the organic metal compound has a merit of not reducing the strength or worsening the smoothness of the substrate since etching is not applied, but there has been a problem that a magnetic layer formed on the substrate often has a portion in which the performance is reduced, and only a substrate of low magnetic characteristic can be obtained.

Pits on the surface of the substrate with Al are formed because of a large cohesion energy of deposited metal (for example, Al) at the surface of the substrate at a high temperature. Then, when taking notice on the adhesion between the substrate and the deposited metal, since the cohesion energy between the atoms of the deposited metal is greater than the interaction between the substrate and the deposited metal, the adhesion between the deposited metal and the substrate is not generally strong. Therefore, when AL is continuously formed on the glass substrate, deterioration occurs at the Al/glass boundary due to the intense frictional force caused upon CSS rest. This is a problem which has to be solved before considering the usual problem of frictional coefficient due to friction between the head and the disk upon CSS test and it is a serious problem in view of the reliability of the magnetic disk.

OBJECT AND THE SUMMARY OF THE INVENTION

It is, accordingly, an object of the present invention to overcome the foregoing problems and provide a substrate used for a magnetic disk capable of manufacturing a magnetic disk or excellent magnetic characteristics and with high productivity, as well as a magnetic recording medium using such a substrate.

The foregoing object of the present invention can be attained by a substrate used for a magnetic disk comprising a non magnetic substrate having pit-forming material disposed on the surface, in which the pit-forming material comprises a low melting metal and has island structures discontinuous in the direction within a plane of the surface of the non-magnetic support.

The magnetic recording medium according to the present invention comprises a magnetic layer present between a non-magnetic support and a protection layer, wherein material comprising a low melting metal having an island structure discontinuous in the direction within a plane is formed to the inner surface of the non-magnetic support such that pits are formed on the surface of the protection layer, and an oxygen trap layer and a magnetic film underlying layer are disposed between the surface of the non-magnetic support formed with the low melting material and the magnetic layer of the non-magnetic support.

As the non-magnetic support in the present invention, there can be mentioned, for example, glass plate, ceramic plate, aluminum plate or titanium metal plate. Among them, the glass plates are used preferably in view of the flatness of the surface and, use of glass plates with soda lime composition manufactured by a floating method, among glass plates, is particularly preferred since they can be available most inexpensively.

As the low melting metal for the present invention any metal or alloy can be used so long as it has a melting point of lower than 1100° C. and, for example, there can be mentioned a metal selected from the group consisting of Ag, Al, Cu, Au, Zn and Pd or an alloy comprising two or more of them. Among them, one or more of alloys selected from the group consisting of Ag, Al, Cu and Au are preferably used since they easily form an island structure with large cohesion energy between metal atoms when deposited.

As a method of forming pits on the surface having the inland structure according to the present invention, physical vapor deposition, for example, sputtering vapor deposition may be applied.

Low melting metal can be coated in an island shape having irregular pits by means, for example, or a physical vapor deposition process such as vacuum vapor deposition or vacuum sputtering in the initial stage of vapor depositing the metal such that the deposited metal can be coagulated on a non-magnetic support while elevating the temperature of the non-magnetic support to a relatively high temperature.

The pit shape can be varied by controlling the temperature of the non-magnetic support and the amount or vapor deposition. Usually, the non-magnetic support is heated to a temperature from 100° to 400° C. to form a pit film having the island structure. As the temperature for the non-magnetic support is increased, the depth of the pit is increased, and the pitch of the pits is decreased as the vapor deposition amount is increased.

There is no particular restriction for the covering rate of the non-magnetic support with the material having the island structure but it is preferably from 10 to 85%, because adhesion between the non-magnet support and the magnetic film is reduced it is more than 85%, whereas desired pits are difficult to obtain if it is less than 10%. Further, the roughness of the surface pits on the non-magnetic support on which the material having the island structure is disposed is usually from 1 to 15 nm and, preferably, from 2 to 8 nm and, more preferably, 2 to 6 nm in average roughness in order to suppress the bit shift. Further, the depth of the island structure (depth of pit) is usually from 5 to 150 nm, and preferably, from 10 to 50 um so that the maximum roughness does not exceed 150 nm, and so that pits are formed on the protection film as the uppermost layer. Further, the pitch of the pits is usually from 0.05 to 1 $\mu$m and, preferably, from 0.1 to 0.5 $\mu$m for providing the surface pits of the uppermost layer and for making the running of the head smooth.

In the magnetic recording medium according on the present invention, pits are formed to the non-magnetic support by means of material made of low melting metal and, usually, an underlying layer for improving the crystallinity of the magnetic film is disposed below the magnetic film disposed on the support. In a case where CoNi series material is used for the magnetic film, Cr or an alloy mainly comprising Cr is usually used for the underlying film.

The underlying layer can remarkably improve the magnetic characteristics but an oxygen trap layer if disposed below the underlying layer can further improve the magnetic characteristics.

As the oxygen trap layer there can be mentioned a metal selected from the group consisting of Ti, Zr, V, Nb, Ta and Y, or an alloy consisting of two or more of them. Among them, Ti is preferred in view of good adhesion with the non-magnetic support and effective oxygen trapping.

The oxygen trap layer prevents uprise of oxygen from the non-magnetic support, improves the crystallinity of the underlying layer and thereby improves the magnetic characteristics as well.

The oxygen trap layer may be disposed either above or below the pit forming material having the island structure.

The present invention has been accomplished in view of the finding that scattering in the magnetic characteristics of a magnetic disk using a magnetic disk substrate prepared by using the organic metal compound described above is caused by oxygen or oxygen-containing gas springing up from the organic metal compound, which partially reduces the crystallinity of the underlying layer thereby causing scattering in the magnetic characteristics. According to the present invention, the foregoing problem can be overcome since a metal free from the worry of evolving oxygen or oxygen-containing gas is used as the material for forming surface pits.

Further, since the substrate is not etched, there is no worry for the reduction or the strength or worsening of the smoothness. Further, since the pits can be formed by a physical vapor deposition process (in particular, sputtering), it can be practiced with good productivity by adding the vapor deposition process as a pre-stage for a succession of vapor deposition steps for forming the magnetic film or the underlying layer. Since the treatment can be conducted by a series or vapor deposition steps, various problems involved in transfer, cleaning, etc. between the steps can be overcome and production steps and yield can be improved outstandingly.

Furthermore, since the pit-forming material formed on the substrate contains the island structure discontinuous in the direction within the plane, the surface of the substrate is not covered entirely with the pit-forming material but partially left exposed. Therefore, if the layer formed on the pit-forming material (for instance, underlying layer or oxygen trap layer) is made of a metal having strong adhesion with the substrate, the exposed portion at the surface of the substrate is in direct contact with the metal layer or strong adhesion. Accordingly, the layer made or the low melting metal having weak adhesion with the non-magnetic support does not cover the entire surface of the non-magnetic support, but an oxygen trap film of good adhesion with the non-magnetic support is bonded firmly and no deterioration occurs.

DETAILED DESCRIPTION OF A PREFERRED EMBODIMENT

Example 1

A soda lime glass substrate cleaned sufficiently (fabricated into a disk and chemically reinforced) was heated to 200° C. in vacuum and an Ag film was formed by a DC magnetron sputtering method by using an Ar gas. Film was formed under the conditions of forming an Ag film of about 25 nm thickness as converted from the conditions for usually forming an Ag film of 100 to 200 nm thickness.

Figure 1:
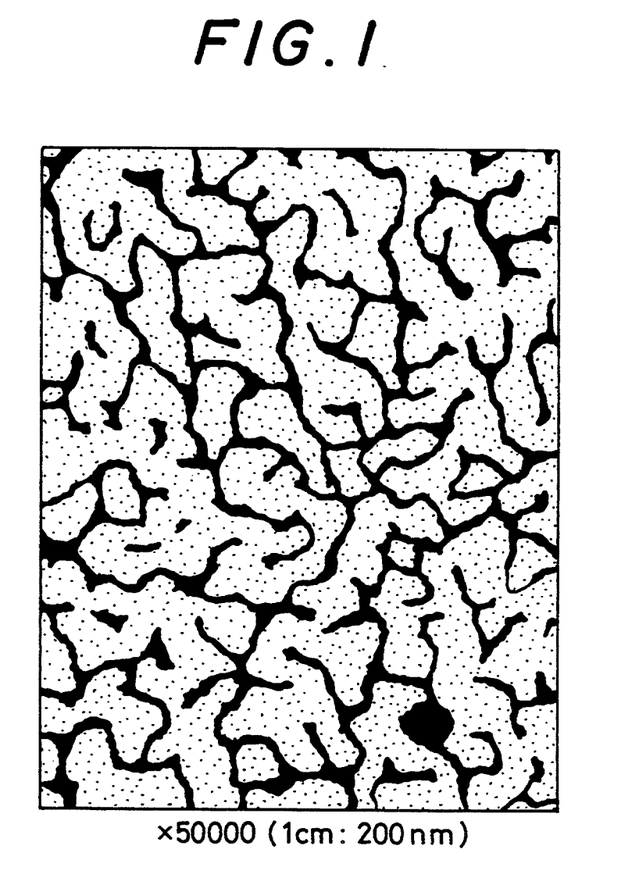
FIG. 1 is a view schematically illustrating the state of pits on the surface of a metal pitting film manufactured as described in Example1, taken by an electron microscopic photograph.

When the thus prepared Ag film was observed by using an electron microscope, a metal island structure depicted in "white" was formed as shown in FIG. 1, in which ridges each with a height of about 25 nm and a lateral width of about 100 nm were irregularly distributed. The covering rate with the Ag film was 84%.

Figure 2:
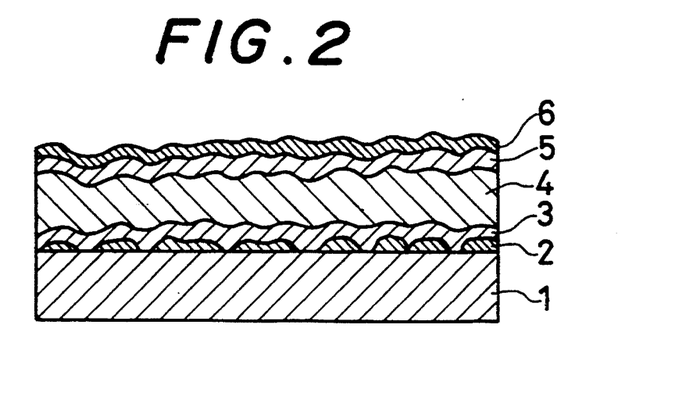
FIG. 2 is a cross sectional view showing the outline of a magnetic disk manufactured in the example.

After coating the magnetic disk substrate 1 manufactured by the method as described above with a Ti film 3 to about 40 nm thickness by a DC magnetron sputtering method also using an Ar gas and, heating the substrate to 200° C., a Cr film 4, a $Co_{0.70}Ni_{0.30}$ film 5 and a protection film 6 made of carbon were successively coated each at a thickness of 150 nm, 60 nm and 30 nm respectively.

The steps from the coverage with the Ti film 3 to the coverage with the protection film 6 made of carbon were conducted without breaking the vacuum state in an in-line type sputtering device.

When the coersive force of the thus prepared magnetic disk was measured, it was about 1500 Oe. In addition, when a CSS test (contact-start-stop test) was conducted after coating a lubricant on the magnetic disk, the frictional coefficient was less than 0.2 even after 30000cycles of CSS.

In this embodiment, the Ti film 3 was disposed as an oxygen trap metal layer below the Cr underlying film 4 for providing an effect of preventing the evolution of gases from the substrate, improving the crystallinity of the Cr film and improving the magnetic characteristics. In fact, the coersive force of the magnetic disk prepared by using in the same procedures as those in Example 1 but without disposing the Ti film was as low as 1300 Oe and the half-value with the diffraction intensity at (110) phase of the Cr film determined by X-ray diffractiometry was broader than that of the Cr film disposed on the Ti film 3.

In this example, covering with the Ag film was conducted separately from the covering step of the magnetic film in order to confirm the covering state of the Ag film, the Ag film can also be coated as the pre-stage for the magnetic film covering.

Further, although the DC magnetron sputtering was used in this example as the vapor deposition of the low-melting metal, the vapor deposition process is not restricted only to the DC magnetron sputtering but RF sputtering or vacuum vapor deposition process, etc. may also be used.

Example 2

Figure 3A:
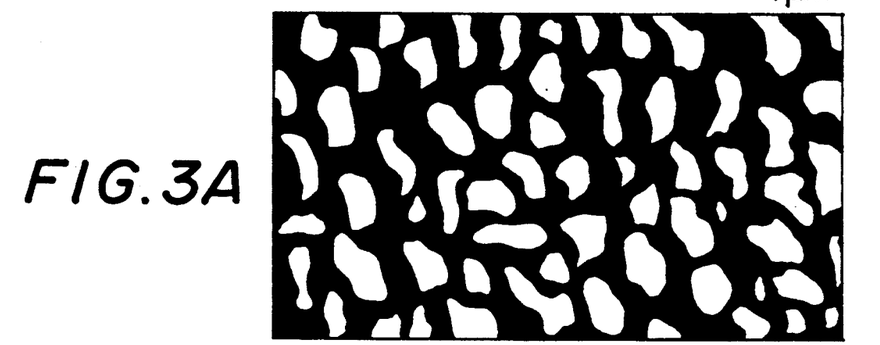
FIG. 3 is a view schematically illustrating the state of pits on the surface of a metal pitting film manufactured in Example 2, taken by an electron microscopic photograph.

After cleaning a soda lime glass substrate (fabricated into a disk and chemically reinforced), it was heated to 260° C. in vacuum and then Al was deposited by a DC magnetron sputtering by using an Ar gas. When the surface roughness of Al was measured by a contact probe (model AY-31, manufactured by Kosaka Kenkyusho), the mean roughness Ra was 6nm and the maximum roughness was 60 nm. FIG. 3(a) shows the shape of pits in "black" surrounding the "white" metal islands.

Since Al was in the island structure, the surface of the substrate was partially exposed. The Al covering rate was about 57%. The Al covering rate was obtained by drawing orthogonal lines on a photograph taken by an electron microscope, accumulating all of the values for the length of Al particles crossing each of the orthogonal lines and calculating as a mean value by dividing them with the length for each of the orthogonal lines.

After coating the magnetic disk substrate 1 manufactured by the method described with a Ti film 3 to about 40 nm thickness by a DC magnetron sputtering using Ar gas and heating the substrate to 200° C., a Cr film 4, $Co_{0.70}Ni_{0.30}$ film 5 and a thin C film 6 were coated successively each at 150 nm, 60 nm and 30 nm thickness respectively.

In this case, steps from the covering with the Ti film 3 to the covering with the protection film 6 made of carbon were continuously conducted without breaking the vacuum state in an in-line type sputtering apparatus.

Figure 3B:
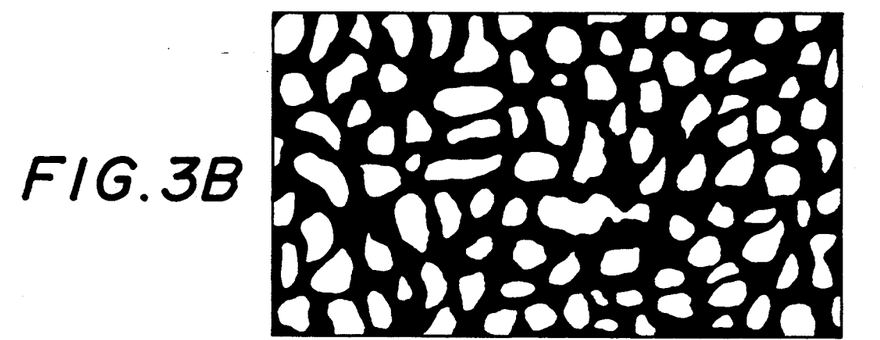
Figure 3C:
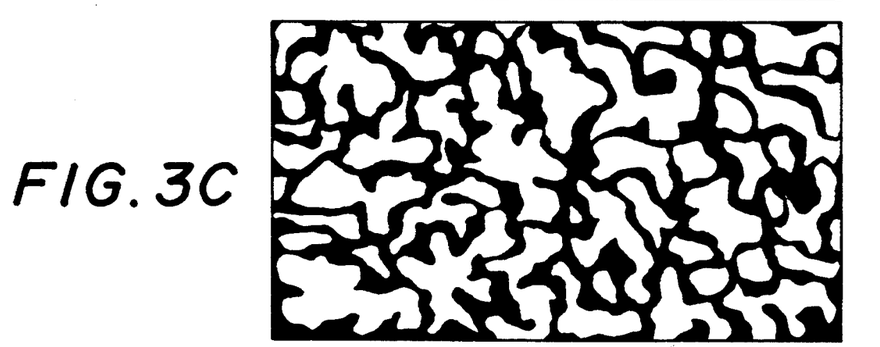
Figure 3D:
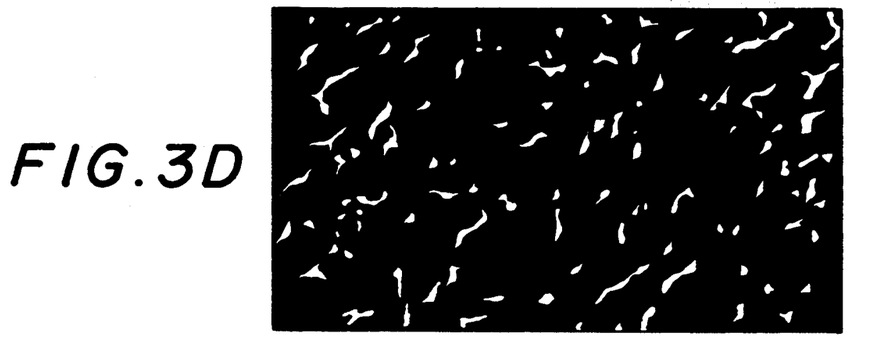

In addition, substrates used for magnetic disks of different Al covering rates of 70%, 80% and 93% respectively were prepared FIGS. 3(b)-(d) show the deposited aluminum in white on the respective substrate. The average roughnesses Ra were 5.4 nm, 5.2 nm and 4.9 nm respectively.

Ti film, Cr underlying film, Co—Ni—Cr alloy film and carbon protection film were coated on such substrates under the same film-forming condition.

After coating a perfluoroalkyl polyether (trade name: Fomblim AM 2001, lubricant) on the thus prepared magnetic disks of different Al covering rates, a CSS test was conducted. The results are shown together with samples obtained in Example 1 in FIG. 4.

Figure 4:
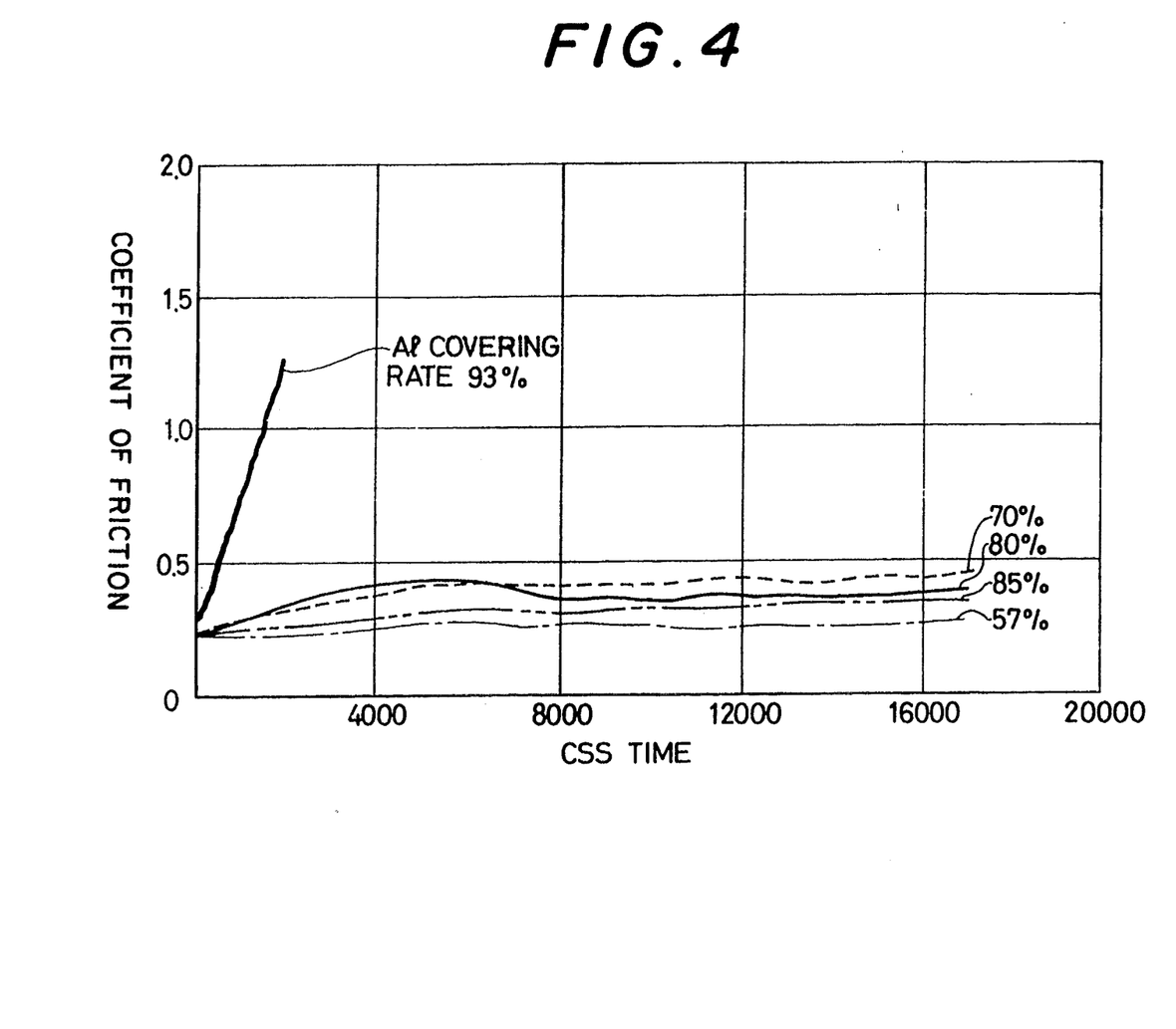
FIG. 4 is a view illustrating the result of a CSS test for the disk manufactured in Example 2.

In this figure, a disk having an Al covering rate of 93%, i.e., having a film structure substantially equal to a continuous film, caused defoliation at 2000 cycle of CSS and the measurement of the frictional coefficient $\mu$ was no more possible. Further, a disk with the Al covering rate of less than 84% was satisfactory with the frictional coefficient of less than 0.5 even after CSS test for 16000cycles. Further, as the AL covering rate was reduced to less than 10%, adsorption between the head and the disk occurred since the average roughness of pits formed by Al particles was less than 2 nm.

Example 3

An Al film was formed on a glass substrate with the same procedures as those in Example 2. In this case, 9 sheets of substrates having average roughness (Ra) from 1 to 7 nm were prepared while varying the substrate temperature for changing the pits formed with the Al film.

On the substrates, Ti film, Cr film, Co—Ni—Cr alloy film and protection film made of carbon were formed under the same covering conditions as those in Example 2. The coersive force for each of the disks was within a range of 1470±50 (Oe).

Figure 5:
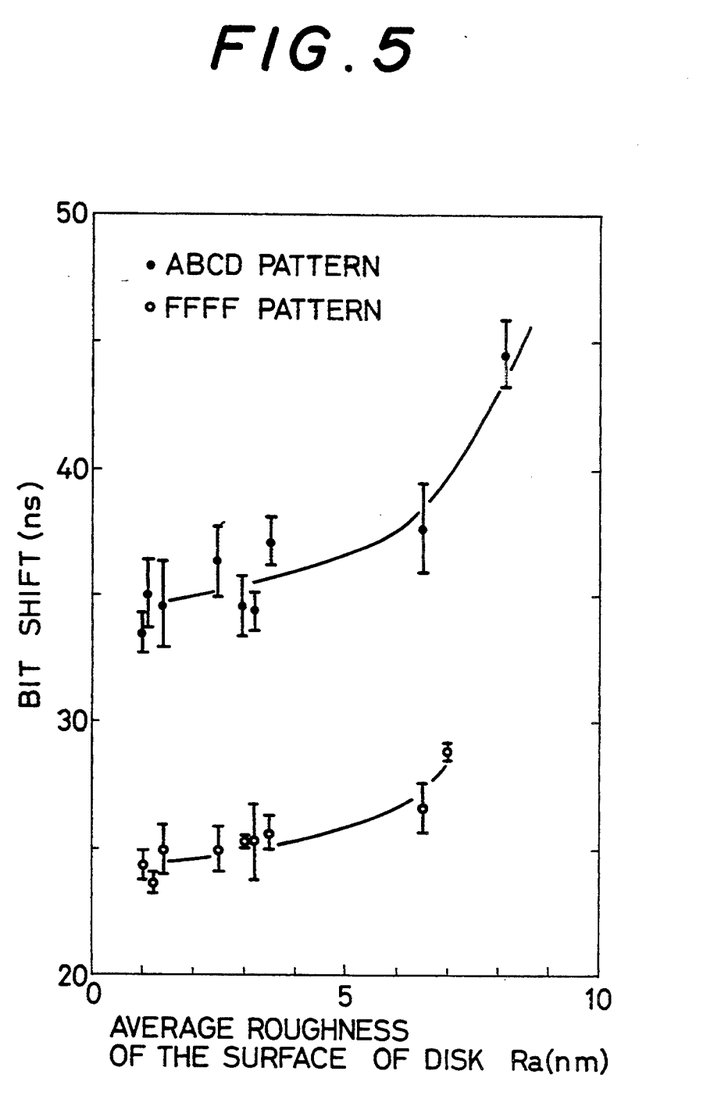
FIG. 5 is a graph illustrating a relationship between the surface roughness of a disk and a bit shift amount in the disk manufactured in Example 3

After coating a perfluoroalkyl ether to the disks, bit shirt was measured by a thin film head (model 3370, taper flat slider) using a disk evaluation machine (GuziKi RWA, 201 B). The amount of bit shirt was measured by writing ABCD and FFFF patterns in a hexadecimal expression. FIG. 5 shows a relationship between the average roughness Ra and the amount of bit shift for each of the disks. From the figure, it can be seen that the amount of bit shift is increased suddenly if the surface roughness of the disk exceeds an average roughness Ra of 8 nm. Since reading errors for the recorded signals are caused if the amount of bit shift is increased, it causes a problem in view of the quality of the magnetic disk.

Accordingly, in a case of a head flying height of about 75 nm, the surface pits of the disk in average roughness Ra is, preferably, from 2 to 5 nm.

Comparative Example

A magnetic disk was prepared with the same procedures as in Example 2 except for reducing the covering speed upon conducting AL covering and forming a pit forming layer comprising a continuous layer with an average roughness of 5.3 nm and a thickness of 70 nm on a glass substrate. The covering rate of the pit-forming material on the magnetic disk was 100%, and when a CSS test was conducted, deterioration occurred at the interface between the Al and the glass substrate at 1000 rotation.

As has been described above specifically, in the substrate used for a magnetic disk according to the present invention, no special fabrication method such as etching is required for the substrate and, since the surface of the substrate is not etched, there is no worry for the reduction of the strength or degradation of the smoothness of the substrate.

On the other hand, since material with no gas evolution such as a metal organic compound is used for the magnetic recording medium in the present invention, it has satisfactory magnetic characteristics and, since pit-forming material having an island structure is used, high reliability with no deterioration is provided.

What is claimed is:

1. A magnetic recording medium in which a thin film magnetic layer of metal or metal ally is present between a non-magnetic support and a protection layer of carbon, wherein material consisting of Al, having an island structure discontinuous in the direction within a plane at the inner surface of the non-magnetic support is formed such that pits are formed on the surface of said protection layer, and a layer of Ti and a magnetic film underlaying layer are disposed between the surface of said non-magnetic support formed with said material and said magnetic layer, said material forming pits and covering at a covering rate from 10 to 85% on said non-magnetic support, average roughness of said material forming pits ranging from 2 to 8 mm, said non-magnetic support comprising a float glass having a soda lime composition.

* * * * *

UNITED STATES PATENT AND TRADEMARK OFFICE
CERTIFICATE OF CORRECTION

PATENT NO. : 5,427,867
DATED : June 27, 1995
INVENTOR(S) : Toshihiro KOGURE et al.

It is certified that error appears in the above-indentified patent and that said Letters Patent is hereby corrected as shown below:

At column 2, line 1, delete "AL" and insert --Al--.

At column 2, line 46, insert --a-- before the word "pits".

At column 2, line 47, insert --as-- before the word "taken".

At column 3, line 9, delete "or" and insert --of--.

At column 3, line 17, delete "or" and insert --of--.

At column 3, line 28, insert --if-- after the word "reduced".

At column 4, line 24, delete "or" and insert --of--.

At column 4, line 38, delete "or" and insert --of--.

At column 5, line 68, insert --.-- after the word "prepared".

At column 6, line 19, delete "AL" and insert --Al--.

At column 6, line 37, delete "shirt" and insert --shift--.

UNITED STATES PATENT AND TRADEMARK OFFICE
CERTIFICATE OF CORRECTION

PATENT NO. : 5,427,867
DATED : June 27, 1995
INVENTOR(S) : Toshihiro Kogure, et al It is certified that error appears in the above-indentified patent and that said Letters Patent is hereby corrected as shown below:

At column 6, line 39, delete "shirt" and insert --shift--.

At column 6, line 57, delete "AL" and insert --Al--.

Signed and Sealed this

Twenty-fifth Day of June, 1996

BRUCE LEHMAN

*Attest:*

*Attesting Officer*    Commissioner of Patents and Trademarks